United States Patent [19]
Flesch

[11] 3,827,319
[45] Aug. 6, 1974

[54] WEIGHT CONTROLLED SLICING SYSTEM
[75] Inventor: Keith E. Flesch, Garrett, Ind.
[73] Assignee: Peter Eckrich & Sons, Inc., Fort Wayne, Ind.
[22] Filed: June 20, 1973
[21] Appl. No.: 372,466

[52] U.S. Cl............................. 83/73, 83/77, 83/86
[51] Int. Cl............................................. B26d 4/56
[58] Field of Search.............. 83/77, 86, 72, 73, 74, 83/75

[56] References Cited
UNITED STATES PATENTS
| | | | |
|---|---|---|---|
| 3,379,234 | 4/1968 | Kasper | 83/77 X |
| 3,476,198 | 11/1969 | Francis | 83/77 X |
| 3,605,837 | 9/1971 | Lambert et al. | 83/77 X |

Primary Examiner—Willie G. Abercrombie
Attorney, Agent, or Firm—Hofgren, Wegner, Allen, Stellman & McCord

[57] ABSTRACT

A weight controlled slicing system for simultaneously and accurately, independently cutting slices from plural loaves in such a way as to minimize give-away. The slicing system includes a single knife and plural means for simultaneously feeding plural loaves toward the knife in a cutting area. Plural slice receivers, each associated with a weight cell, are adapted to receive the slices from the respective loaves as they are cut and signal a control system that controls the feed rate of each feeding means in accordance with the slices cut in a desired package weight. To minimize the number of components required, the various control functions relative to each weigh cell are multiplexed.

6 Claims, 3 Drawing Figures

WEIGHT CONTROLLED SLICING SYSTEM

BACKGROUND OF THE INVENTION

This invention relates to slicing systems and, more particularly, to weight controlled slicing systems.

Because of the relatively strict regulation of the food industry with respect to labeling practices, food producers have historically put more food in a container than stated on the label in order to insure that the great majority of containers will have at least the stated weight of food contained therein. The excess of food actually in the container over and above that stated to be contained therein is termed "give-away" in view of the fact that the consumer pays for a package having the stated weight of food contained therein but in reality will normally receive somewhat more food.

While the amount of "give-away" in a typical container is generally nominal in terms of the percentage of the stated weight, those skilled in the art are well aware of the fact that over a period of a year, the cost of such "give-away" to a given food producer will be substantial. Thus, every effort is made to minimize the amount of "give-away" and yet maintain a required percent of packages at a weight equal to or above the stated weight within the regulations of the appropriate governing body.

One area in which extensive effort has been expended to minimize "give-away" is in the marketing of multiple slice food packages containing such food stuffs as cheese and meat products such as sandwich meat. Most of the efforts have centered about the slicing operation and a typical weight controlled slicing system reduces "give-away" to an average of about 3 percent. Through use of one recently proposed system, the average "give-away" has been reduced to about 1 percent. This system is that disclosed in the commonly assigned Lambert, et al. U.S. Pat. No. 3,605,837.

Systems embodying the Lambert, et al., principles have been extremely successful in accomplishing their intended purpose in reducing "give-away." Nonetheless, there remains a need for improved weight controlled slicing systems that provide "give-away" minimization comparable to that provided by the Lambert, et al., system and which reduce equipment cost relative to capacity or units produced per given increment of time.

SUMMARY OF THE INVENTION

It is the principal object of the invention to provide a new and improved weight controlled slicing system. More particularly, it is an object of the invention to provide a weight controlled slicing system which reduces give-away to a figure comparable to that obtained by the Lambert et al system identified above and which further provides the advantage of reducing equipment cost relative to the capacity of the system in terms of its output.

An exemplary embodiment of the invention achieves the foregoing object in a structure including a slicing machine in which a blade is mounted for movement to a slicing area. In the preferred embodiment, the knife is mounted on a shaft for rotation to the slicing area. Above the slicing area, plural feeding devices are located and are arranged to feed loaves or the like to be sliced progressively into the slicing area to be encountered by the knife at various locations within the slicing area. Below the knife, slice receiving platters are located at positions corresponding to the location of the feeding devices for receiving slices as they are cut from the loaf fed by the associated feeding device.

Each of the slice receiving platters is associated with a weigh cell such that the weight of an accumulating stack of slices on the platter may be monitored and compared to a standard or desired weight for the number of slices then cut.

Deviations between the actual weight and the standard weight are determined to generate an error signal which is then employed to make an adjustment in the feed rate of the corresponding feeding means. For example, if the actual weight of the stack of slices is less than the standard weight, the error signal will be employed to increase the rate which will result in thicker slices being cut so as to increase the weight of the stack. On the other hand, if the actual weight of the stack is greater than the standard weight for the number of slices then cut, the error signal will be utilized to retard the feed rate to cause the cutting of thinner slices to thereby decrease the weight of the stack relative to the standard. In both instances, at the completion of the cutting of a predetermined number of slices, the actual stack weight will be extremely close to the standard weight desired for that number of slices. At that time, the slices are removed from the platter and conveyed to a packaging area.

While the invention may be practiced using totally independent control systems for each of the feeders and associated weigh cells, it is preferred to share certain of the components. To this end, the control system includes multiplexing equipment.

Other objects and advantages of the invention will become apparent from the following specification taken in connection with the accompanying drawings.

DESCRIPTION OF THE PREFERRED EMBODIMENT

Figure 1:
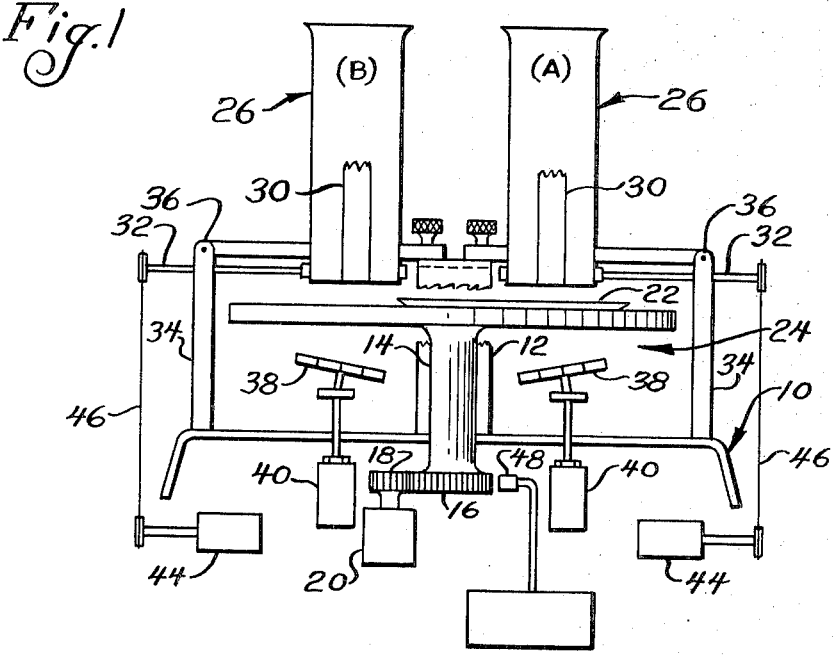
FIG. 1 is a somewhat schematic, side elevation of a slicing apparatus made according to the invention with parts shown in section.
Figure 2:
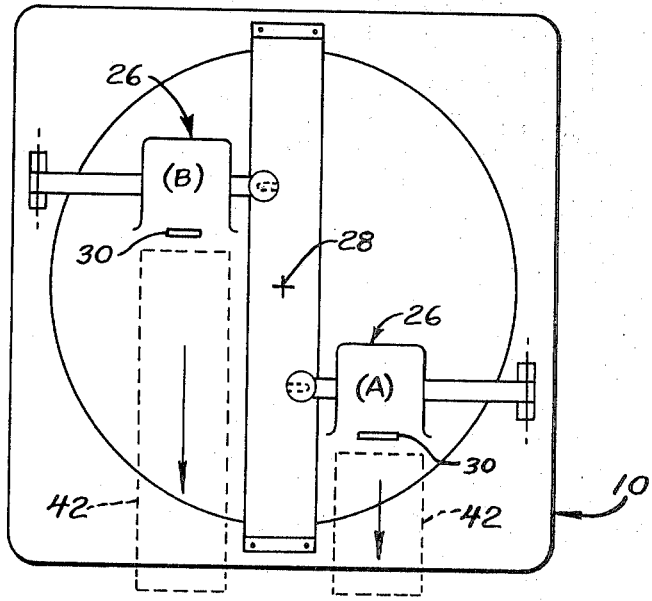
FIG. 2 is a somewhat schematic plan view of the slicer.

An exemplary embodiment of a slicing system made according to the invention is illustrated in FIGS. 1 and 2 and is seen to include a slicing machine having a base, generally designated 10. The base 10, by means of a sleeve 12, journals a rotary shaft 14 having a gear 16 on its lower end in mesh with a gear 18 on the output shaft of a drive motor 20. The upper end of the shaft 14 mounts a slicing blade 22 with the result that when the motor 20 is energized, the blade 22 will be rotated within a slicing area, generally designated 24.

Above the slicing area, there is provided a pair of conventional feeding devices 26 which are operative to feed an object to be sliced, such as a loaf, into the slicing area 24 to be sliced by the blade 22 and the latter is rotated. As best seen in FIG. 2, two such feeding devices 26 are provided and the same are equally radially spaced about the rotational axis of the blade 22 as defined by a point 28.

Each of the feeding devices 26 will typically include a product engaging chain schematically illustrated at 30 which have a product engaging run which is driven downwardly to advance a loaf in the feeding device into the feeding area 24. Representative structure for this purpose is illustrated in the previously identified patent to Lambert, et al.

The chains 30 for the respective feeders 26 are driven by any suitable means. For example, the same could be driven by independent motors provided for that purpose or, alternatively, by means of gearing from the motor 20. In either event, a variable speed drive unit is associated with each of the chains 30 and includes an operating shaft 32 which may be rotated in either direction to increase or decrease the rate of movement of the chains 30, and thus the feed rate.

The basic structure further includes a support linkage 34 for each of the feeders 26 including a pivot 36 whereby each of the feeders 26 may be pivoted away from the position illustrated in FIG. 1 for servicing or the like.

On the side of the slicing area 24 opposite the feeders 26, there is provided a pair of slice receiving platters 38, one for each of the feeders 26. The platters 38 are arranged so as to receive slices as they are cut by the knife 22 from the loaf being fed by the associated feeder. Each platter 38 is, in turn, associated with a weight cell 40 which is operative to monitor the weight of the slices received on the associated platter 38 to provide an output signal representative of the same. Preferably, the platters 38 and their associated weigh cells 40 are constructed in the manner disclosed in my commonly assigned, copending application Ser. No. 351,444, filed Apr. 16, 1973 and entitled "Improved Slice Receiving Platter For Slicing Apparatus."

Associated with each of the platters 38 is a take-away conveyor schematically illustrated at 42 which is operative, when energized, to take an accumulated stack of slices from the associated platter 38 and convey the same to a point for further processing. The interrelationship of the take-away conveyors 42 to the platter 38 may be ascertained by reference to my aforementioned copending application.

Other structure includes plural control or stepping motors 44, one for each of the feeders 26, and each having mechanical coupling to the associated control shaft 32, as schematically indicated at 46. Also provided is a magnetic pickoff device 48 which is operative to sense the relative angular position of the blade 22 within the slicing area 24 and provide timing pulses in a generally conventional manner. The timing pulses in general correspond to those disclosed in the above identified Lambert et al patent with the exception that, according to the invention herein, a slicing cycle consists of one revolution of the blade 22 as opposed to two in the Lambert et al structure. In this regard, it should also be observed that the instant invention, according to the exemplary embodiment, does not contemplate knife position adjustment within the slicing area 24 as is contemplated by Lambert, et al. The lack of this feature results in slightly increased give-away for relatively small stacks, i.e., stacks comprised of a relatively small number of slices as, for example, four slices. On the other hand, for relatively large stacks having a greater number of slices as, for example, eight or more, give-away on slices resulting from the instant invention is held to substantially the same limit as provided by Lambert, et al. It should be observed that, if desired, such adjustment could be provided along the general teachings provided by Lambert along with those additional principles disclosed hereinafter. However, this may result in a decrease in maximum slicing speed and/or the necessity of providing precision mechanical equipment having a high response speed which may be extremely costly. Such facts tend to mitigate against the use of knife position adjustment, but where a given operation renders such factors relatively insignificant, it is contemplated that knife position adjustment may be provided in the instant invention.

Figure 3:
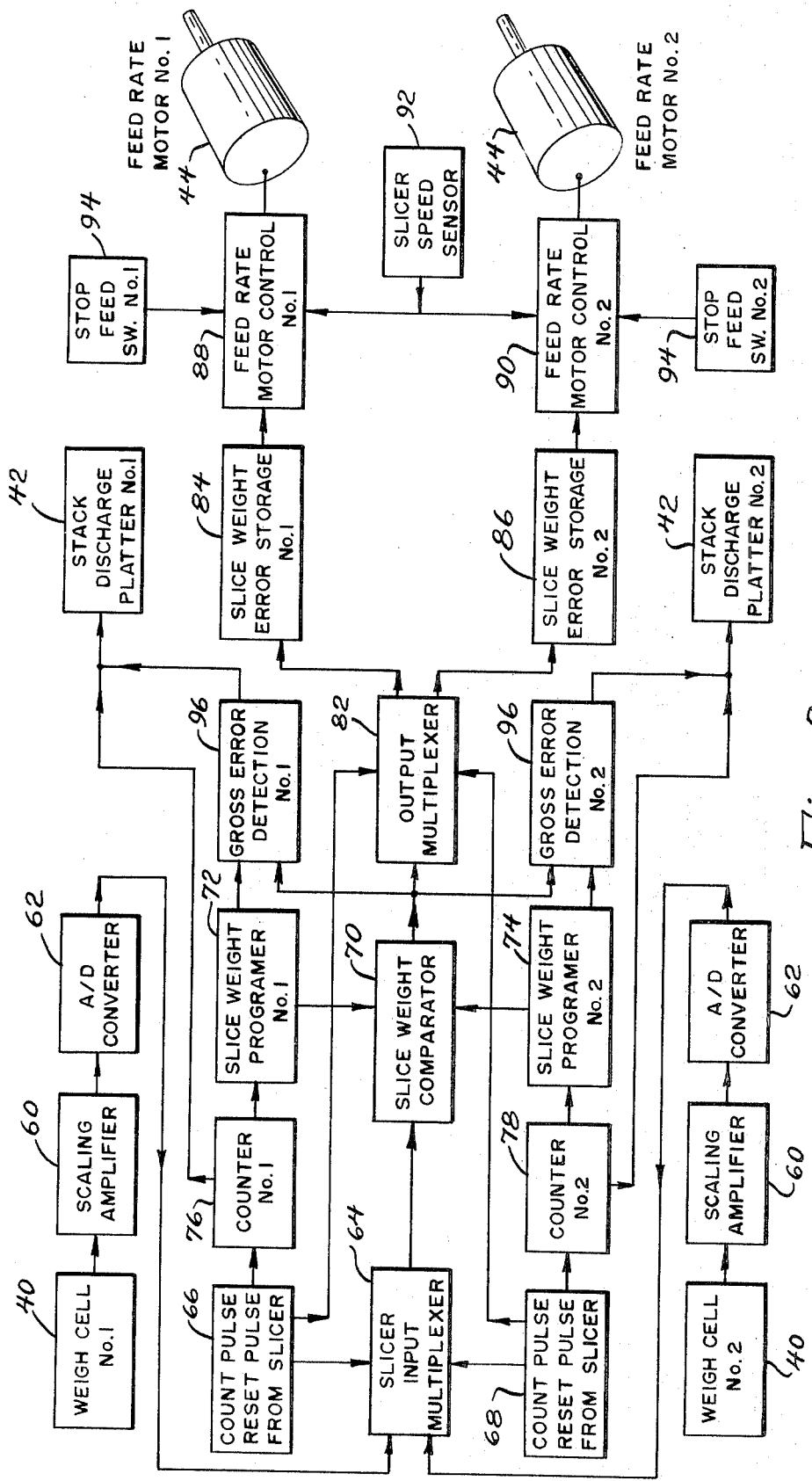
FIG. 3 is a block diagram of a control for the slicing apparatus.

Turning now to FIG. 3, a control circuit for the slicing system will be described in detail. Each of the respective weigh cells 40 provides an electrical output signal representative of the actual weight of the stack of slices resting on the associated platter 38 to a scaling amplifier 60. The scaling amplifiers are suitably adjusted so that their respective output in terms of volts per ounce of accumulated stack weight are identical as, as will be seen, a single comparator is employed to provide control information to both of the feeders at different times during a slicing cycle. Thus, it is advantageous, although not absolutely necessary, that scaling be identical for both of the feeders. In addition, the scaling amplifiers 60 are employed to standardize output signals due to internal deviations from one weigh cell 40 to the next.

The output of each scaling amplifier is directed to an associated analog to digital converter 62 which, in turn, provides an actual weight signal for its associated platter 38 to an input multiplexer 64. That is, the multiplexer 64 receives actual weight signals from all of the weigh cells 40 employed in the system.

The multiplexer 64 receives control signals from associated pulse generators 66 and 68. The pulse generators are associated with the magnetic pickoff 48 and, in the exemplary embodiment, provide count pulses indicating the number of slices cut and reset pulses (in the manner taught by Lambert, et al) to their associated control circuitry 180° out of phase with each other. The count pulses are directed to the multiplexer 64 to cause the same to switch between the two channels of information represented by the outputs of the two weigh cells 40. Thus, at one point in time, the multiplexer will provide an output signal representating the actual weight of slices accumulated on one of the platters 38 while in the next succeeding period of time, it will provide an output signal representative of the actual weight of slices accumulated on the other of the platters 38.

In either event, the output of the multiplexer is directed to a single, slice weight comparator 70. In addition to the actual weight signal from either of the weigh cells 40 depending upon the channel selected by the multiplexer 64, the comparator receives standard weight signals from first and second standard weight programmers 72 and 74. The slice weight programmers 72 and 74 are functionally constructed in accordance with the principles set forth in the above identified Lambert, et al., patent although, using conventional data processing techniques, they are constructed to provide a digital output rather than an analog output.

More specifically, the signals provided represent the desired weight for a stack having a particular number of slices. Since, as during successive slicing cycles, the number of slices in a stack will change, each of the programmers 72 and 74 is provided with slice count information by slice counters 76 and 78, respectively, which, in turn, count the slices based on the receipt of count pulses from the associated pulse generators 68 and 66.

Finally, a suitable connection from the multiplexer is provided to one of the comparators or the programmers 72 and 72 to allow information from only one of the comparators 72 and 74 to be provided to the comparator 70, which information will correspond to the desired stack weight for the stack whose actual stack weight signal is being passed by the multiplexer 64.

As a result of the foregoing, the slice weight comparator, by comparing an actual weight signal with a standard weight signal, will, after substantially each slice cut, provide an error signal to a junction 80. This error signal is employed to cause an appropriate adjustment in the feed rate of the corresponding feeder for the next slice to be cut in the same general manner taught by Lambert, et al., in the above identified patent. However, because two feeders are involved, an output multiplexer 82 is connected to the junction 80. The output multiplexer 82 also receives count pulse signals from the count pulse generators 66 and 68 such that it is able to direct the error signal to the appropriate one of the feeder controls. That is, when the slice weight comparator is comparing actual weight and standard weight for one of the stacks, any resultant error signal will be directed to the feeder corresponding to that stack by the output multiplexer 82.

The outputs of the multiplexer 82 are directed to either one of two slice weight error storage devices 84 and 86. The particular storage device to which the information is directed is, of course, dependent upon the channel being monitored by the multiplexer 64. The function of the storage devices 84 and 86 is to store error information sufficiently long so as to enable response by mechanical elements since the error information would otherwise be wiped out upon a change in channels being monitored. The output from each of the storage devices 84 and 86 is fed to a corresponding feed rate motor control circuit 88 or 90 of conventional construction which, in turn, provides a control signal to a corresponding one of the feed rate control motors 44. If an adjustment is required by reason of the existence of an error, the corresponding motor 44 will drive through the linkage 46, the corresponding control shaft 32 to adjust the feed rate to increase or decrease the same as the case may be.

Where the motor 20 is of the variable speed type, a slicer speed sensor 92 may be provided to provide initial feed rate information to each of the feed rate motor controls. Additionally, for servicing purposes, stop switches 94 may be associated with each of the feed rate motor controls for the purpose of stopping either or both of the corresponding feed rate adjustment as, for example, for servicing purposes.

The system also includes a pair of gross error detecting circuits 96, one for each channel, which are connected to receive information from the junction 80 as well as from the corresponding slice weight programmers 72 or 74. Where gross errors are detected, the circuits 96 provide information connoting that fact to the corresponding takeaway system 42 to cause premature actuation thereof. The purpose of gross error detection and the manner of fabricating the control can be ascertained from my commonly assigned U.S. Pat. No. 3,667,520.

Lastly, each of the take-away systems 42 may be actuated in response to an output from the corresponding one of the slice counters 76 and 78 when a preset, predetermined number of slices have been cut.

From the foregoing, it will be appreciated that a slicing system made according to the invention attains the same reduction in give-away attainable by that of Lambert et al and provides the additional advantage of minimizing equipment cost. For example, the output of the slicing machine itself is increased proportionally to the number of feeders located thereon. Moreover, the use of multiplexing between the various control circuits for each of the feeders permits a number of components to be shared thereby further reducing cost.

Finally, the fact that the system employs individual counters and programmers for each feeder allows a single machine to cut slices of varying desired weights and to provide stacks containing a varying number of slices. For example, if the counters and programmers are constructed in accordance with the general principles of Lambert, et al, 1½ ounce slices to form, for example, an eight-slice stack may be cut onto one of the platters 38 while the other is receiving 1 ounce slices, 16 to a stack.

I claim:

1. A weight controlled slicing system comprising: a single knife; means defining a cutting area; means mounting said knife for cyclical movement through said cutting area; means for cyclically driving said knife through said cutting area; a plurality of feeding devices located on one side of said cutting area and at spaced locations for progressively advancing an object to be sliced into said cutting area; a plurality of slice receiving devices on the other side of said cutting area, one for each of said feeding devices, and arranged to receive slices from the object being fed into the slicing area by the associated feeding devices as they are cut by said knife; plural weighing means, one for each of said slice receiving means and associated therewith for providing a signal relative to the weight of slices received on the associated slice receiving means; means for generating a desired weight signal for a given number of slices; means for comparing said actual weight signals and said desired weight signal to determine any difference therebetween; and means responsive to a deviation determined by said comparing means for adjusting the feed rate of a corresponding one of said feeding means.

2. Slicing apparatus according to claim 1 wherein there are plural ones of said desired weight signal providing means, one for each of said feeding means; said comparing means comprising a single comparator; and multiplexing means for sequentially providing said comparator with corresponding actual weight and desired weight signals and for associating said comparator with the feeding means corresponding to the weighing means whose actual weight signal is being provided to said comparator at that particular point in time.

3. Slicing apparatus according to claim 1 wherein said means mounting said knife for movement through said slicing area includes a rotary shaft for rotating said knife within said sliding area, and said plural feeding means are equally radially spaced about the axis of rotation of said shaft.

4. A weight controlled slicing system comprising: a knife movable through a cutting area; means for driving the knife through said cutting area; a plurality of feeding devices on one side of said cutting area each operable to progressively feed an object to be sliced into said feeding area; a plurality of means, one for each feeding means, for determining the actual weight of slices cut by said knife from the object fed into said feeding area by the associated feeding device and for providing a signal proportional thereto; a plurality of means, one for each of said feeding means, for providing a desired weight signal proportional to a desired weight for the number of slices cut from the object fed by the corresponding feeding means; a single comparator adapted to receive corresponding ones of said actual weight and desired weight signals and determining a difference therebetween; a plurality of means, one for each of said feeding devices, for adjusting the feed rate thereof; and sequencing means for sequentially receiving corresponding ones of said actual weight and desired weight signals and for providing said signals to said comparator; and further sequencing means responsive to said comparator for providing a feed rate correction signal based on a determination of difference between said signals by said comparator to the corresponding one of said feed rate adjusting means.

5. Slicing apparatus according to claim 4 further including a plurality of slice receiving means on said other side of said cutting area, each corresponding to one of said feeding devices and adapted to receive slices cut from the object fed by the corresponding feeding device, said plural weighing means each being associated with corresponding ones of said slice receiving means; a plurality of means, one for each said slice receiving means for removing an accumulated stack of slices therefrom; and plural means, one for each of said feeding means, independently operable to cause the corresponding one of said receiving means to receive slices from its associated slice receiving means after a predetermined number of slices have been cut, said predetermined number being independently selectable for each of said feeding means.

6. Slicing apparatus according to claim 4 wherein said actual weight and said desired weight signals are provided after substantially each slice cut and said comparator is operable to compare said signals after substantially each slice cut.

* * * * *